US006637206B2

(12) United States Patent
Thiessen

(10) Patent No.: US 6,637,206 B2
(45) Date of Patent: Oct. 28, 2003

(54) METHOD AND APPARATUS FOR COMBINED STEAM BOILER/COMBUSTER AND GASIFIER

(75) Inventor: Randall J. Thiessen, 2215 320th St., Toledo, IA (US) 52342

(73) Assignees: Lavoy M. Thiessen Jr., Parker, CO (US); Randall J. Thiessen, Toledo, IA (US)

( * ) Notice: Subject to any disclaimer, the term of this patent is extended or adjusted under 35 U.S.C. 154(b) by 0 days.

(21) Appl. No.: 10/050,910

(22) Filed: Jan. 18, 2002

(65) Prior Publication Data

US 2003/0136127 A1 Jul. 24, 2003

(51) Int. Cl.[7] .............................................. F01K 13/00
(52) U.S. Cl. ........................ 60/670; 60/676; 60/39.182
(58) Field of Search ......................... 60/670, 653, 671, 60/682, 676, 39.02, 39.182

(56) References Cited

U.S. PATENT DOCUMENTS

| | | | |
|---|---|---|---|
| 4,497,637 A | | 2/1985 | Purdy et al. |
| 4,617,182 A | * | 10/1986 | Brown et al. ................ 208/113 |
| 5,507,141 A | * | 4/1996 | Stigsson ................... 162/30.11 |
| 5,563,803 A | * | 10/1996 | Morihara et al. ............ 209/473 |
| 5,626,638 A | | 5/1997 | Valkanas |
| 5,666,801 A | * | 9/1997 | Rohrer ....................... 60/39.12 |
| 5,937,652 A | | 8/1999 | Abdelmalek |
| 5,938,975 A | | 8/1999 | Ennis et al. |

FOREIGN PATENT DOCUMENTS

| | | |
|---|---|---|
| DE | 2546441 A | 4/1976 |
| DE | 3642619 A | 6/1988 |
| WO | WO 9826215 A | 6/1998 |

OTHER PUBLICATIONS

Copy of website: http://www.woodgas.com No Date.
Article entitled: "Biomass Gasification—Technology and Utilization," http://members.tripod.de/cturare/bio.html No Date.

Article entitled: "Biomass Gasification—Technology and Utilization, History and Development," http://members.tripod.de/cturare/his.html No Date.

Article entitled: "ITE Tire Pyrolysis & Gasification Exchange," http://www.tirestyres.com/a/rb8070.html.

Article entitled: "Biomass gasifiers: A viable option," http://www.teriin.org/news/terivsn/issue30/biomass.html No Date.

Article entitled: "A Bioenergy Innovation From Community Power Corporation." No date.

Article entitled: "Cow Power," By Gillian Flaccus, The Des Moines Register, Nov. 28, 2001. Business Section, p. 1D.

Pamphlet entitled: "Evaluation of Gasification and Novel Thermal Processes for the Treatment of Municipal Solid Waste," by Niessen, Walter R.; Marks, Charles H.; and Sommerlad, Robert E.; Aug. 1996, NREL/TP–430–21612.

Pamphlet entitled: "A Survey of Biomass Gasification 2001—Gasifier Projects and Manufacturers Around the World," 2nd Edition, by Reed, Thomas B. and Gaur, Siddhartha, The National Renewable Energy Laboratory and The Biomass Energy Foundation, Inc.

* cited by examiner

Primary Examiner—Hoang Nguyen
(74) Attorney, Agent, or Firm—McKee, Voorhees & Sease, P.L.C.

(57) ABSTRACT

A method and apparatus for providing a steam boiler/combuster and gasifier that uses a primary dirty fuel, such as waste materials, or high-polluting fossil fuels, and a secondary low-polluting fuel, such as biomass fuels for co-generation of electricity while reducing harmful emissions. The primary fuel is burned in the combuster to create steam in the steam boiler. The steam turns a steam turbine thereby powering a first generator. The dirty exhaust from the combuster is scrubbed by a gasifier. The secondary fuel and oxygen are added to the dirty exhaust in the gasifier creating gas and ash. The gas powers an engine that turns a second generator and releases a cleaner exhaust.

28 Claims, 3 Drawing Sheets

METHOD AND APPARATUS FOR COMBINED STEAM BOILER/COMBUSTER AND GASIFIER

BACKGROUND OF THE INVENTION

1. Field of the Invention

The present invention relates generally to a method and apparatus for providing a combined steam boiler/combuster and gasifier. More particularly, though not exclusively, the present invention relates to a method and apparatus for a combined steam boiler/combuster and gasifier that cleanses emissions and provides co-generation of power from the burning of waste materials or low-grade coals.

2. Problems in the Art

Currently, there are many types of combined steam boiler/combuster and gasifier systems known in the art. However, the gasification process is the primary energy generation means. Gasification systems generally take materials, such as wood, coal, charcoal, agricultural residues, energy crops, municipal solid waste or other biomass materials, and gasify them to make a "producer gas" used for power or electricity generation. A typical gasification system consists of a gasifier unit, filtering system, and an energy converter.

Steam boiler/combuster units are well-known, though their use as primary energy generation has been questionable for some time, mainly because of the harmful resultant emissions. A steam boiler/combuster creates high pressure steam used for power generation. Prior art systems apply steam boiler/combuster units as secondary energy generation means to gain energy and thus increased efficiency from the gases and char produced during the gasification process.

For example, U.S. Pat. No. 5,937,652 to Adelmalek, uses the gasifier as the primary energy converter. Adelmalek shows a gasifier that converts biomass fuel into a producer gas and char. The producer gas, generally a mixture of carbon monoxide, hydrogen and hydrocarbon, is then sent into a boiler and burned with the char to produce the high pressure steam needed to power a steam generator. Carbon dioxide is re-circulated into the gasifier. However, the flue gas from the boiler, containing other potentially harmful emissions, is allowed to escape into the atmosphere.

Similarly, in U.S. Pat. No. 5,626,638 to Valkanas, the gasification process is the primary means for energy conversion. Only the gases from the gasifier are used to power a gas turbine and to feed a steam generator. The flue gases from the steam generator are potentially harmful and yet are allowed to escape into the atmosphere. There is therefore a need for a method and apparatus that can provide useful power from biomass and other materials while minimizing the harmful emissions from the boiler.

Boilers used in prior art systems use carbonaceous fuels, typically, accepting the gases from the gasifier, for steam generation. However, there are currently certain fossil fuels and many types of waste material, such as shingles and used tires, that have fuel potential but are not used because of the high amounts of pollutants created during the combustion process. These are dirty fuels. For example, a typical used tire when burned directly creates an array of toxic byproducts such as dioxins, furans, PAHs, PCBs, hexavalent chromium, and cadmium. Other toxic byproducts from tire burning include mercury, lead, nickel, beryllium, xylene, toluene, phenol, mono-chlorobenzene, napthalene, formaldehyde and acetaldehyde. Similar observations can be made for bituminous coal. It is therefore preferable to gasify the tire and burn the gas which is much easier to control and clean.

In the case of solid waste, if these waste materials are not used, they typically wind up in city dumps or landfills. In 1998, there were over 270 million used tires. Putting these waste materials to use for energy production would significantly reduce the size of landfills. There is therefore a need for a method and apparatus for energy production that can use these products as fuel while minimizing the harmful emissions typically associated with burning these materials.

3. Features of the Invention

A general feature of the present invention is the provision of method and apparatus for providing a combined steam boiler/combuster and gasifier which overcomes the problems found in the prior art.

A further feature of the present invention is the provision of a method and apparatus for providing a combined steam boiler/combuster and gasifier which is capable of burning dirty fuels such as waste materials or low-grade coal.

A further feature of the present invention is the provision of a method and apparatus for providing a combined steam boiler/combuster and gasifier that uses two different types of fuel. Preferably, the primary fuel is a high-energy/high-polluting fuel used to generate most of the energy from the system, and the secondary fuel is a relatively low-energy/low-polluting fuel.

Another feature of the present invention is the provision of a method and apparatus for providing a steam boiler/combuster that can burn waste materials and low-grade coal combined with a gasifier to minimize harmful emissions.

A further feature of the present invention is the provision of a method and apparatus for providing a combined steam boiler/combuster and gasifier that can generate power from both the steam boiler/combuster and the gasifier.

A still further feature of the present invention is the provision of a method and apparatus for providing a combined steam boiler/combuster and gasifier wherein the steam boiler/combuster is the primary energy conversion means.

Another feature of the present invention is the provision of a method and apparatus for providing a combined steam boiler/combuster and gasifier wherein the biomass added to the gasifier is used to minimize the hazardous emissions from the steam boiler/combuster.

These, as well as other features and advantages of the present invention, will become apparent from the following specification and claims.

SUMMARY OF THE INVENTION

The present invention generally comprises a method and apparatus for providing a combined steam boiler/combuster and gasifier. In one embodiment, the steam boiler/combuster is fed waste materials such as shingles, tires, etc. The combustion process produces heat that generates steam for a steam turbine. The steam turbine turns a first generator that produces electricity.

The exhaust from the combustion process is fed into a gasifier. Biomass materials are added to the gasifier. The size and design of the gasifier and the amount of biomass materials added to the gasifier preferably is proportional to the amount of exhaust from the combustion process and the type of biomass fuel used in the gasifier. A majority of the heavy materials from the exhaust drop out during gasification. Burning both the exhaust from the combuster and the biomass materials produces ash and producer gas.

Pure oxygen may be added to the gasification process thereby turning the producer gas into synthesis gas that may be of higher energy. If high nitrogen products of combustion from the boiler furnace are recycled into the gasifier, the use of oxygen could keep further $N_2$ addition down. An external source of heat may also be added to turn the producer or synthesis gas into a still higher energy pyrolysis gas. The producer, synthesis, or pyrolysis gas is then routed to an engine such as a micro turbine that turns a second generator. Thus, co-generation of electricity occurs from the burning of biomass and waste materials or low grade coal while harmful emissions are minimized.

DETAILED DESCRIPTION OF THE PREFERRED EMBODIMENT(S)

The present invention will be described as it applies to its preferred embodiment. It is not intended that the present invention be limited to the described embodiment. It is intended that the invention cover all modifications and alternatives which may be included within the spirit and scope of the invention.

Figure 1:
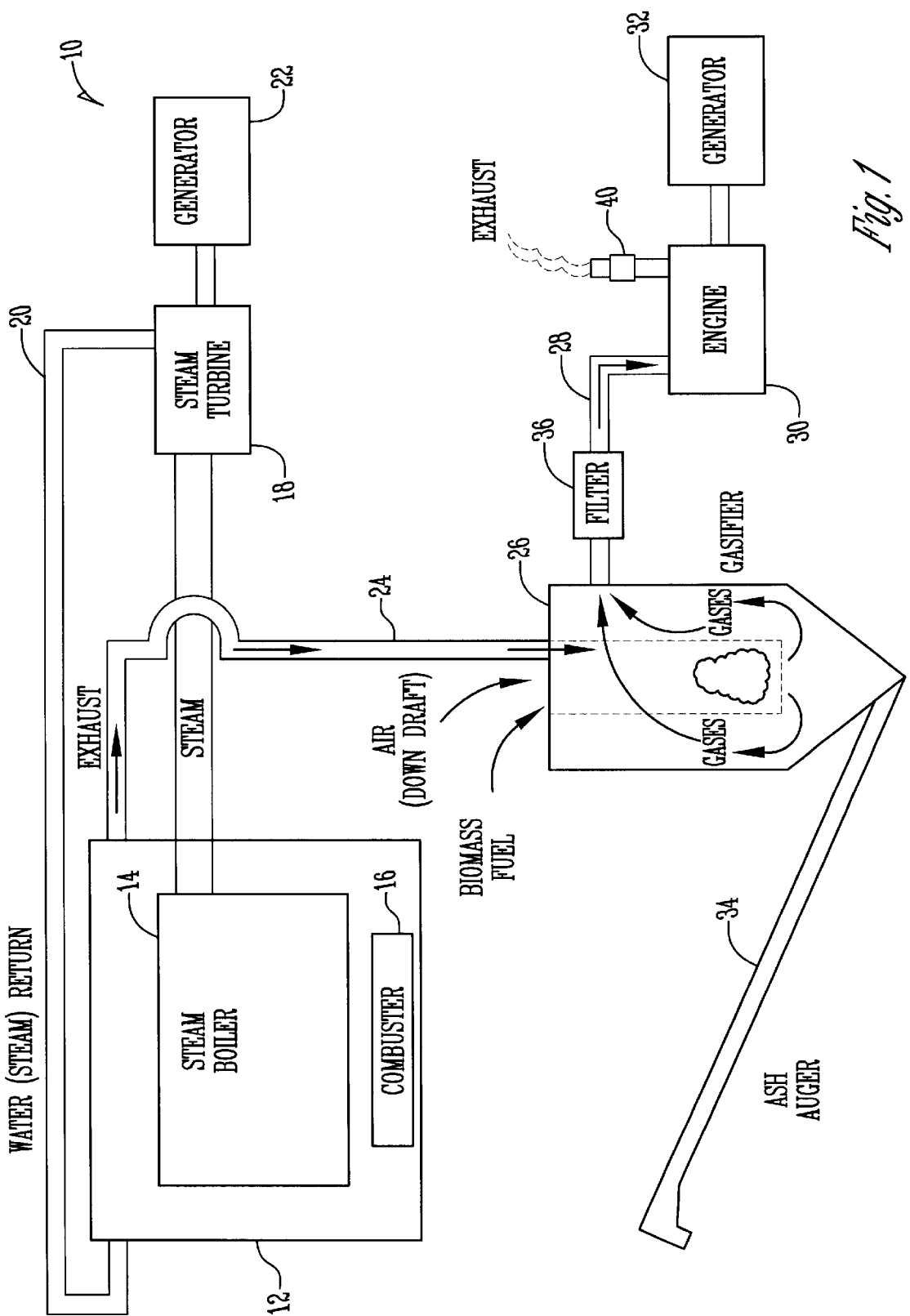
FIG. 1 is a diagrammatic representation of the steam boiler/combuster and gasification system according to a preferred embodiment of the claimed apparatus and method.

Now, referring to the drawings, FIG. 1 illustrates the steam boiler/combuster and gasification system 10 of the present invention. Unlike the prior art systems, the steam boiler/combuster 12 is the primary energy converter in the present invention. Steam boilers and combusters are well known in the art. Dirty fuels such as untreated or processed tires, shingles, landfill or waste materials, bituminous coal (also know as low-grade, #2 or high sulfur content coal) or other low quality carbonaceous fuels, etc. are burned in the combuster 16 to produce heat for a steam boiler 14. These dirty fuels typically have a relatively high energy content, but when burned tend to also produce a relatively high amount of pollutants.

Water in the steam boiler 14 absorbs this heat creating steam. This steam may be used to provide thermal, mechanical or electrical energy. Preferably, the steam is routed to a steam turbine 18. Optionally, a compressor may be added to provide the high pressure steam typically needed for power generation. The steam turbine 18 provides power to a first generator 22 that creates electricity. During this process, the steam in the steam turbine 18 condenses into water that can be recycled 20 for use in the steam boiler 14.

Burning dirty fuels results in dirty exhaust 24 that may contain several hazardous materials. The present invention routes the dirty exhaust 24 from the combuster 16 into a gasifier 26. Blowers or fans, pumps or other equipment can be added to ensure proper flow of the dirty exhaust 24 is maintained. Preferably, a downdraft gasifier 26 is used though another type of gasifier, such as a modified sidedraft gasifier may be substituted. The dirty exhaust 24 will typically contain a relatively small amount of combustible gasses and significant amount of heavy and dirty materials. The gasification process is preferably started with a propane ignition system which is well-known in the art.

Figure 3:
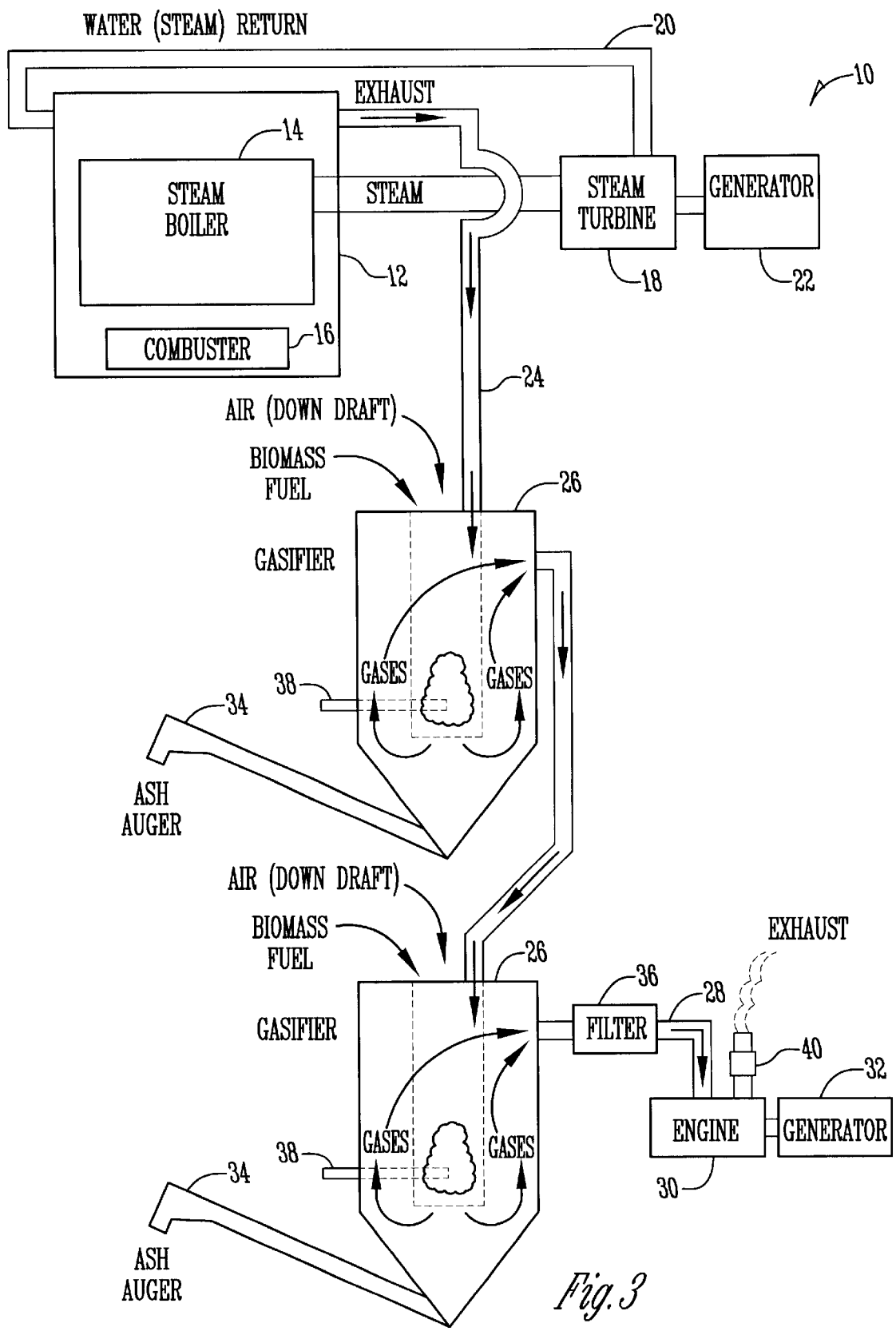
FIG. 3 is a diagrammatic representation of the steam boiler/combuster and gasification system according to another embodiment of the claimed apparatus and method wherein multiple gasifiers are used in series.

During gasification, the dirty exhaust 24 is added to a secondary fuel, preferably biomass and oxygen, either from the ambient air or an oxygen supply system. The secondary fuel may be added using a lock hopper above the gasifier, an auger up from a feeder box, or any other system common to the art. The fuel added to the gasifier may tend to build up and block incoming air. To remedy this problem, an air or oxygen vent 38 can be added to the gasifier 26 to allow air or oxygen to flow directly to the core of the gasifier 26 as is shown in FIG. 3. A pumping system can be added to the vent 38 to force air or oxygen into the core. Wood chips, wood pellets, or agricultural biomass, such as corn, are the preferred biomass materials. The amount of biomass materials to be added to the gasifier 26 will depend on the amount of incoming dirty exhaust 24. A computer driven system, common in the art, can be used to properly balance the amount of biomass material added to properly correspond to the amount of incoming dirty exhaust 24.

Temperatures produced during gasification will be on the order of 1200 to 2400 degrees Fahrenheit. The flame of the down draft system burns downward, causing solid, non-burnable materials, including the heavy materials from the gasification of the biomass and dirty exhaust, to precipitate or fall out as an ash that can be removed by an ash auger 34. The ash can then be properly treated and/or disposed of. In this process, pollutants are either chemically decomposed or precipitated out of the core along with the other solid, non-burnable materials.

Figure 2:
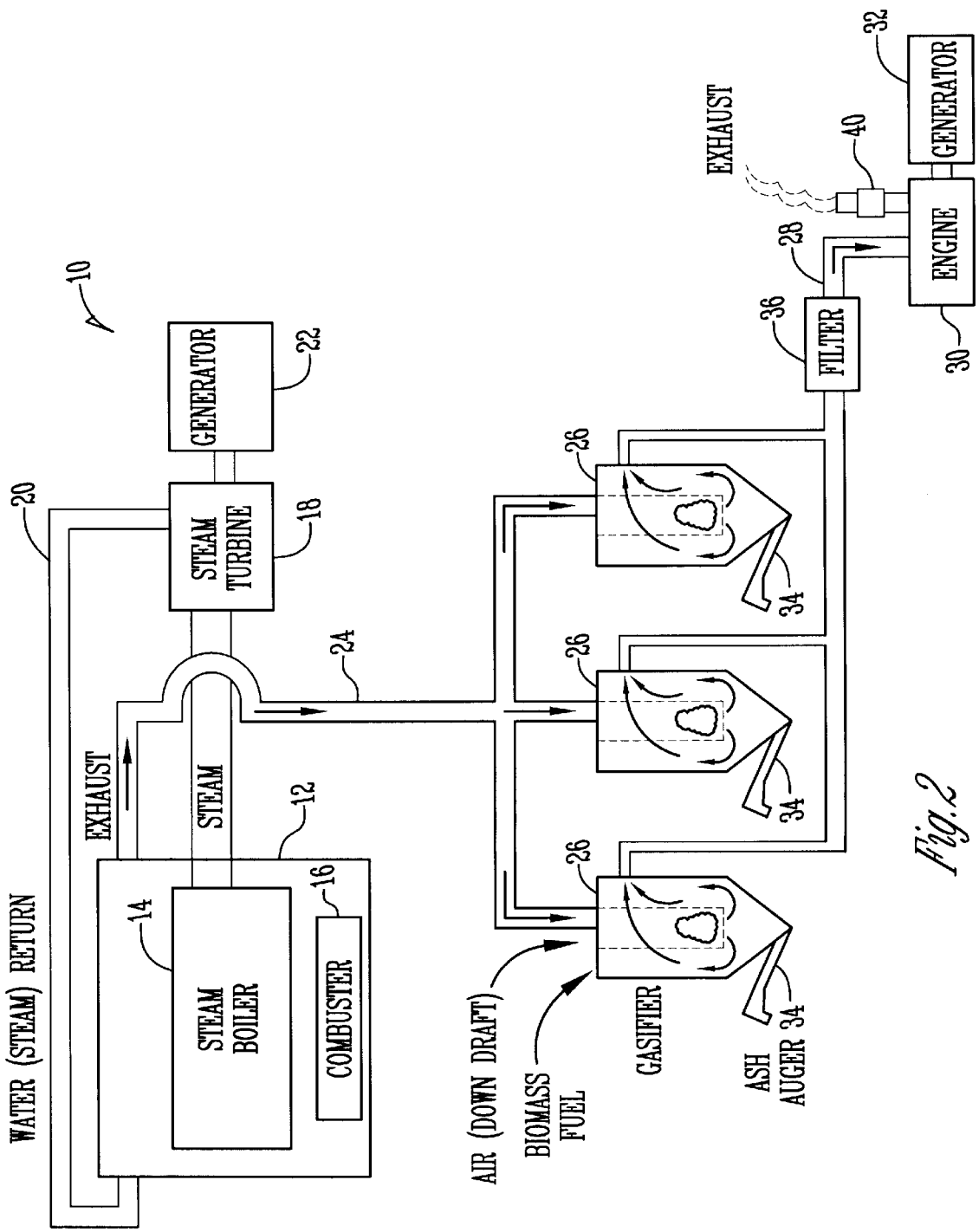
FIG. 2 is a diagrammatic representation of the steam boiler/combuster and gasification system according to another embodiment of the claimed apparatus and method wherein multiple gasifiers are used in parallel.

Depending on the size of the steam boiler/combuster, more than one gasifier can be used as is shown in FIGS. 2 and 3. Additional gasifiers can be added in parallel, as shown in FIG. 2, to accommodate higher amounts of exhaust 24 or in series, as shown in FIG. 3, to further clean the steam boiler/combuster's exhaust 24. A twin or dual sidedraft gasifier might also be used.

The remaining gas 28 from the gasifier 26 contains combustible gasses and heat from both the gasification and combustion processes. The gas 28 is generally clean enough to be used by a fuel cell to generate electricity. Preferably, the gas 28 is sucked into the engine 30 and burned. Of course, fans or pumps may be used as regulators, if necessary, to ensure the gas 28 flows properly into the engine 30. A cotton fiber or similar type of filter 36 is typically placed in the flow of the gas 28 between the gasifier and engine to remove any particulates that may remain in the gas 28. Preferably a micro turbine or spark engine is used, but a fuel cell or another type of engine, such as a compression, Sterling, or larger gas turbine engine, may be substituted. The engine 30 provides a third treatment of certain residual contaminants of the original emissions 24, producing exhaust that is much cleaner than the dirty exhaust 24, and power to turn a second generator 32. The second generator 32 creates additional electricity, thereby increasing the overall energy efficiency of the steam boiler/combuster. Additional engines and generators can be added in parallel if need be.

The residual heat produced from the gasification process may be used to pre-heat the water used for steam generation or for hot water heating, drying, etc. Further, the exhaust from the engine may be run through a filter 40 such as a catalytic converter, muffler, etc. Or the exhaust could again then be processed through another gasifier. This should remove most of any remaining pollutants.

Thus, the combined steam boiler/combuster and gasification system of the present invention uses dirty fuels such as materials that were previously considered waste products, or currently unusable fossil fuels, and a secondary fuel to accomplish co-generation and provide electricity while minimizing harmful exhaust fumes from all fuels used.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. An apparatus for converting dirty fuels to steam and useful gas, the apparatus comprising:
    a combuster burning dirty fuels producing heat and exhaust;
    a steam boiler receiving the heat from the combuster to produce steam;
    a gasifier wherein biomass material and the exhaust from the combuster result in useful gas; and
    an engine operatively linked to the gasifier to produce power from the useful gas.

2. The apparatus for converting dirty fuels of claim 1 wherein the engine is a turbine.

3. The apparatus for converting dirty fuels of claim 1 wherein the engine is a spark engine.

4. The apparatus for converting dirty fuels of claim 1 wherein the dirty fuels are used tires.

5. The apparatus for converting dirty fuels of claim 1 wherein the dirty fuels are shingles.

6. The apparatus for converting dirty fuels of claim 1 wherein the biomass material is agricultural biomass.

7. The apparatus for converting dirty fuels of claim 1 wherein the biomass material is corn.

8. The apparatus for converting dirty fuels of claim 1 wherein the biomass material is wood.

9. A method for providing electricity from the burning of dirty fuels while reducing harmful emissions, the method comprising:
    providing a dirty fuel;
    burning the dirty fuel in a combuster creating heat and exhaust;
    transferring heat from the burning of the dirty fuel in the combuster to a steam boiler to create steam;
    routing the steam into a steam turbine;
    turning the steam turbine to power a generator to create electricity;
    routing the exhaust from the combuster into a gasifier;
    providing biomass material;
    adding biomass material to the gasifier;
    operating the gasifier with the exhaust and the biomass material creating gas and ash;
    routing the gas into an engine; and
    operating the engine to power a generator creating electricity.

10. The method for providing electricity from the burning of dirty fuels while reducing harmful emissions of claim 9 further comprising allowing air to flow into the gasifier through a vent.

11. The method for providing electricity from the burning of dirty fuels while reducing harmful emissions of claim 9 further comprising forcing air into the gasifier through a vent.

12. The method for providing electricity from the burning of dirty fuels while reducing harmful emissions of claim 9 further comprising forcing oxygen into the gasifier through a vent.

13. The method for providing electricity from the burning of dirty fuels while reducing harmful emissions of claim 9 further comprising returning water from the steam turbine to the steam boiler.

14. The method for providing electricity from the burning of dirty fuels while reducing harmful emissions of claim 9 further comprising removing the ash from the gasifier with an ash auger.

15. The method for providing electricity from the burning of dirty fuels while reducing harmful emissions of claim 9 wherein the gasifier is a down draft gasifier.

16. The method for providing electricity from the burning of dirty fuels while reducing harmful emissions of claim 9 wherein the engine is a turbine.

17. The method for providing electricity from the burning of dirty fuels while reducing harmful emissions of claim 9 wherein the gasifier is a side-draft gasifier.

18. The method for providing electricity from the burning of dirty fuels while reducing harmful emissions of claim 9 wherein the dirty fuel is low-grade coal.

19. An apparatus for co-generation of power that reduces the pollution of a burned primary fuel, the apparatus comprising:
    a combuster for burning a primary fuel creating heat and dirty exhaust;
    a steam boiler operatively connected to the combuster for generating steam;
    a steam turbine operatively linked to the steam boiler for turning the steam into power;
    a first generator operatively connected to the steam turbine for turning the power into electricity;
    a gasifier linked to the combuster, wherein the gasifier receives the dirty exhaust, a secondary fuel, and oxygen to produce useful gas and ash;
    an engine operatively linked to the gasifier, whereby the engine is powered by the burning of the useful gas; and
    a second generator operatively connected to the engine to create additional electricity.

20. The apparatus for co-generation of power of claim 19 further comprising an additional gasifier arranged in series.

21. The apparatus for co-generation of power of claim 19 further comprising an additional gasifier arranged in parallel.

22. The apparatus for co-generation of power of claim 19 wherein the oxygen is from ambient air.

23. The apparatus for co-generation of power of claim 19 wherein the gasifier is a down-draft gasifier.

24. The apparatus for co-generation of power of claim 19 wherein the primary fuel includes tires.

25. The apparatus for co-generation of power of claim 19 wherein the primary fuel includes low-grade coal.

26. A method for providing electricity from the burning of dirty fuels while reducing harmful emissions, the method comprising:
    providing a dirty fuel;
    burning the dirty fuel in a combuster creating heat and exhaust;
    transferring heat from the burning of the dirty fuel in the combuster to a steam boiler to create steam;
    routing the exhaust from the combuster into a gasifier;
    providing biomass material;

adding biomass material to the gasifier;

operating the gasifier with the exhaust and the biomass material creating gas and ash;

routing the gas into an engine; and operating the engine to power a generator creating electricity.

27. An apparatus for co-generation of power that reduces the pollution of a burned primary fuel, the apparatus comprising:

a combuster for burning a primary fuel creating heat and dirty exhaust;

a gasifier linked to the combuster, wherein the gasifier receives the dirty exhaust, a secondary fuel, and oxygen to produce useful gas and ash;

an engine operatively linked to the gasifier, whereby the engine is powered by the burning of the useful gas; and a second generator operatively connected to the engine to create additional electricity.

28. An apparatus for converting dirty fuels to steam and useful gas, the apparatus comprising:

a combuster burning dirty fuels producing heat and dirty exhaust;

a steam boiler receiving the heat from the combuster to produce steam; and a downdraft gasifier wherein biomass material and the dirty exhaust from the combuster result in useful gas.

* * * * *